United States Patent

Gaylord

[11] 3,762,001
[45] Oct. 2, 1973

[54] LINE RELEASE
[75] Inventor: John A. Gaylord, Greenbrae, Calif.
[73] Assignee: H. Koch & Sons, Inc., a division of Global Systems, a Gulf and Western Company, Marin County, Calif.
[22] Filed: Feb. 22, 1972
[21] Appl. No.: 228,057

[52] U.S. Cl. .................................. 24/230 A, 9/11 A
[51] Int. Cl. .............................................. A44b 19/00
[58] Field of Search ................... 24/230 R, 230 LP, 24/230 NP, 230 A, 230 AL, 230 AN, 230 AV, 230 SC, 201 SL, 201 LP; 9/11 A; 244/148, 149

[56] References Cited
UNITED STATES PATENTS
2,922,604   1/1960   Hatfield ............................. 244/148
3,102,316   9/1963   Cadley ............................. 24/230 A
3,107,370   10/1963  Gaylord ......................... 24/230 AV
3,120,365   2/1964   Gutacker ........................... 244/149

FOREIGN PATENTS OR APPLICATIONS
1,022,675   3/1966   Great Britain ..................... 244/149
1,188,641   4/1970   Great Britain .................... 24/230 A Primary Examiner—Donald A. Griffin
Attorney—George B. White

[57] ABSTRACT

This line release is particularly adapted for pulling a releasing line connected to the actuator of a survival kit, has a base which is adapted to be sewn or fixedly secured to one of the straps of a parachute harness, and has a hole through which the actuating line is inserted. The line is secured to a ring in an open recess in the base engageable by a finger to pull the line for actuation. A pivoted spring pressed locking disk is in the bottom of the recess and projects into the ring so as to obstruct and prevent the pulling of the ring unless the disk is first pushed out of the ring.

2 Claims, 4 Drawing Figures

PATENTED OCT 2 1973  3,762,001
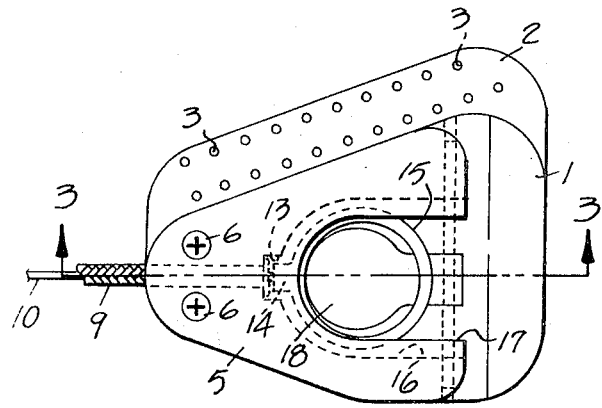
FIG. 1.
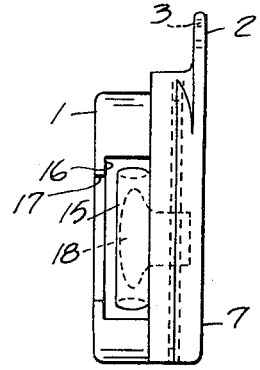
FIG. 2.
FIG. 3.
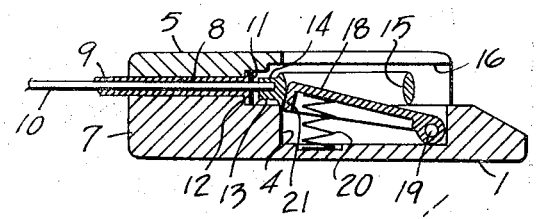
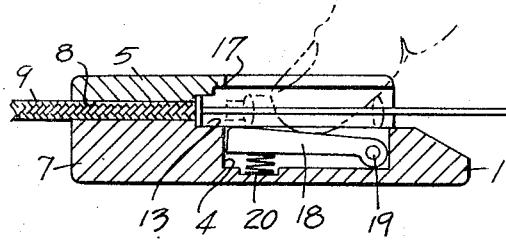
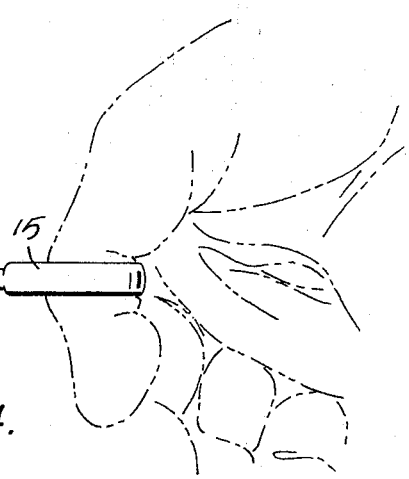
FIG. 4.

LINE RELEASE

BACKGROUND OF THE INVENTION

In certain situations, particularly in actuating the release of a survival kit for aircraft personnel, it is of importance to prevent the accidental pulling of the actuator line.

The primary object of the invention is to provide means for conveniently locating or securing the end of a pull line for manipulation, yet blocking the engageable end of the line in such a manner that the locking means must be first released before the line can be pulled, and wherein releasing and pulling manipulation can be accomplished by a simple movement of the fingers.

BRIEF DESCRIPTION OF DRAWINGS

FIG. 1 is a plan view of the line release.
FIG. 2 is an end view of the line release
FIG. 3 is a sectional view taken on lines 3—3 of FIG. 1.
FIG. 4 is a sectional view as in FIG. 3 showing the engagement and pulling of the line.

DETAILED DESCRIPTION

A base 1 has a flange 2 with holes 3 therein for sewing the base on a strap of a parachute harness. The base has a recess 4. A cover plate 5 is secured by suitable screws 6 onto the solid end 7 of the base 1. The plate 5 has a passage 8 extended therethrough to accommodate the tubular casing 9 of the pull line 10. The passage 8 terminates in an enlarged recess 11 forming a shoulder engageable by a retaining flange 12 on the inner end of the line casing 9. The enlarged end 7 of the base 1 has a recess 13 complemental to the recess 11 so as to accommodate a ferrule 14 on a finger ring 15.

The cover plate 5 is undercut to provide a groove 16 around an opening 17. The pull ring 15 is of larger diameter than the width of the opening 17 whereby the pull ring is confined so that it is guided by the groove 16 longitudinally of the opening 17.

A locking disk 18 is held by a pivot 19 in the recess 4 of the base 1. A coil spring 20 in the recess 4 bears against the underside of the disk 18 to urge the latter into the ring 15, thereby to lock the ring 15 against releasing movement. A flange 21 abuts against the adjacent wall of the recess 4 as shown in FIG. 3 to limit the outward position of the disk 18 and also to engage the inner periphery of the ring 15 at the ferrule 14. The recess 4 is of sufficient depth to receive the disk 18 when pushed into an out of the way position as shown in FIG. 4.

In operation when the person wants to pull the line 10, in order to actuate the release of a survival kit, for instance of the type shown in U.S. Pat. No. 2,992,798, it is only necessary to put one finger in the ring 15 and either by the same finger or by another finger push the disk 18 from the position shown in FIG. 3 into the concealed, out of the way position shown in FIG. 4, and pull the ring 15 as shown in FIG. 4 for actuation.

I claim:
1. A line release comprising,
a base,
there being a passage on the base accommodating a line therethrough,
a member engageable by a finger on the end of said line and in said base,
there being an opening on said base for access to said engageable member,
a spring pressed lock on said base engageable with said member for blocking movement of said member from said base, and
said lock being accessible for manipulation for disengaging said lock from said member thereby to release said member for pulling said line,
said member being a ring,
there being a guide groove formed on said base and around said ring, said guide groove being open to permit the pulling of said ring out of said base, and surrounding said opening for access for finger engagement of said ring,
said lock being pivoted in said base beneath said ring so as to be movable into an out of the way position from said ring.
2. The line release specified in claim 1, and
a flexible casing surrounding said line and being held in said passage.

* * * * *